Figures 1, 2, 3:
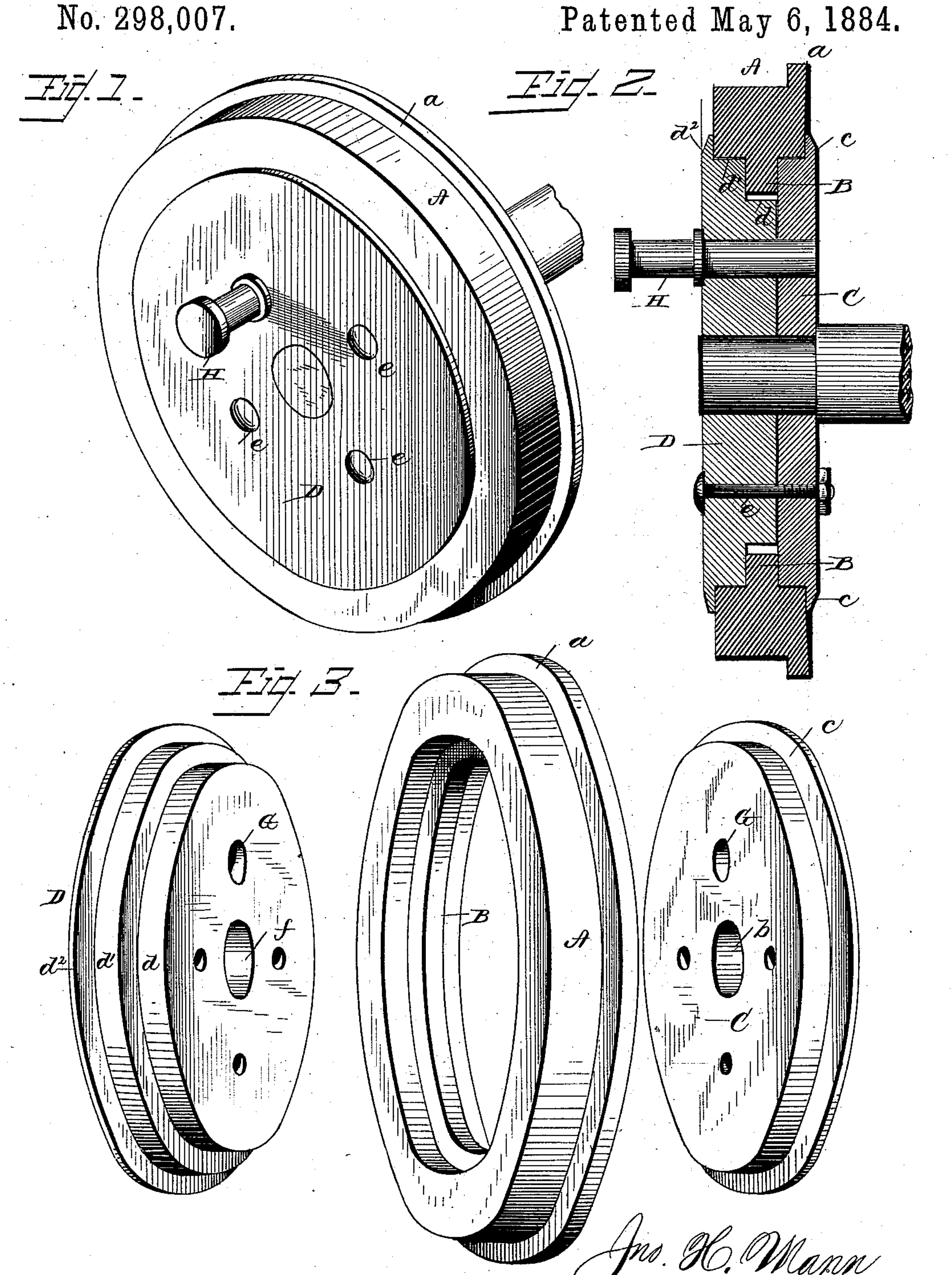

(No Model.)

J. H. MANN.

LOCOMOTIVE WHEEL.

No. 298,007. Patented May 6, 1884.

WITNESSES
F. L. Ourand
E. G. Siggers

Jno. H. Mann
INVENTOR by C. A. Snow & Co
Attorneys

N. PETERS, Photo-Lithographer, Washington, D. C.

UNITED STATES PATENT OFFICE.

JOHN H. MANN, OF CRAFTON, ASSIGNOR OF ONE-HALF TO NEWTON J. MYERS, OF DECATUR, TEXAS.

LOCOMOTIVE-WHEEL.

SPECIFICATION forming part of Letters Patent No. 298,007, dated May 6, 1884.

Application filed January 26, 1884. (No model.)

*To all whom it may concern:*

Be it known that I, JOHN H. MANN, a citizen of the United States, residing at Crafton, in the county of Wise and State of Texas, have invented a new and useful Locomotive-Wheel, of which the following is a specification, reference being had to the accompanying drawings.

My invention relates to locomotive drive-wheels; and it has for its object to so construct the same as to avoid all slipping of the wheel upon the rail, as is usually the case when the locomotive is first started.

A further object of the invention is to provide a wheel which shall be simple in its construction and durable in use.

The invention consists in the improved construction and combinations of parts hereinafter fully described, and pointed out in the claim.

In the drawings, Figure 1 is a perspective view of a locomotive-wheel constructed in accordance with my invention. Fig. 2 is a transverse section of the same, and Fig. 3 is a perspective view of parts detached.

In the accompanying drawings, in which like letters refer to corresponding parts throughout the several figures, A represents the rim or tire of the wheel, which is provided with the usual rail-flange, *a*. This outer rim, A, is provided on its inner side with an outwardly-projecting flange, B, which extends around the entire circumference of the rim A.

Upon the side of the wheel upon which is formed the flange *a*, and resting against the inner flange, B, at its lower end is a plate, C, which is formed with a circumferential flange, *c*, which rests or bears upon the outer side of the rim A. This plate C is provided with a central perforation or opening, *b*, for the passage of the axle.

D represents a core or filling, which is preferably cast, and is formed with three different diameters, thus forming steps $d$ $d'$ $d^2$, the inner step, *d*, being of the same width as the flange B, and being seated in the center of the wheel or rim A. The step $d'$ is seated in the space formed by the projecting flange B, and bears against said flange at its lower end, its peripheral edge bearing against the inner side of the rim A, the upper step or flange, $d^2$, bearing upon the outer sides of the rim A. This core or filling D and the plate C are secured together by means of transverse bolts *e*, thus forming a core for the outer rim, A. The core D is provided with a central opening, *f*, which registers with the opening *b* of the plate C, and through which passes the axle connecting the opposite wheels. The core D and plate C are provided with an opening, G, a short distance from the central shaft-opening, in which is secured a crank-pin, H, which is designed to be connected with the connecting-rod of the adjacent wheel.

From the foregoing description it will be apparent that a wheel constructed in accordance with my invention prevents all slipping of the same upon the rail, and that its contruction is simple and durable.

It will also be seen that my invention is applicable to the ordinary car-wheel.

Having fully described my invention, what I claim as new, and desire to secure by Letters Patent, is—

The combination, with a rim, A, having the flange B, of a core, D, consisting of the portions $d$ $d'$ $d^2$, a plate, C, having a flange, *c*, said core and plate being secured to the rim by transverse bolts, and having a central opening for the axle, and being also provided with a hole or opening within which is seated a crank-pin, substantially as set forth.

In testimony that I claim the foregoing as my own I have hereto affixed my signature in presence of two witnesses.

JOHN H. MANN.

Witnesses:

JOHN W. MOORE,
WILLIAM RENSHAW.